(12) United States Patent
Qian et al.

(10) Patent No.: US 8,762,570 B2
(45) Date of Patent: Jun. 24, 2014

(54) METHOD AND APPARATUS FOR ADAPTIVE FORWARDING STRATEGIES IN CONTENT-CENTRIC NETWORKING

(71) Applicant: Futurewei Technologies, Inc., Plano, TX (US)

(72) Inventors: Haiyang Qian, Santa Clara, CA (US); Ravishankar Ravindran, San Jose, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 18 days.

(21) Appl. No.: 13/672,924

(22) Filed: Nov. 9, 2012

(65) Prior Publication Data

US 2013/0219081 A1  Aug. 22, 2013

Related U.S. Application Data

(60) Provisional application No. 61/601,321, filed on Feb. 21, 2012.

(51) Int. Cl.
*G06F 15/173* (2006.01)
*H04L 12/54* (2013.01)

(52) U.S. Cl.
CPC .................................. *H04L 12/56* (2013.01)
USPC ....................................................... 709/241

(58) Field of Classification Search
CPC ...... H04L 43/08; H04L 12/5689; H04L 12/56
USPC ....................................................... 709/241
See application file for complete search history.

(56) References Cited

U.S. PATENT DOCUMENTS

| | | | |
|---|---|---|---|
| 7,519,734 B1* | 4/2009 | Dumitriu et al. | 709/238 |
| 2005/0198351 A1* | 9/2005 | Nog et al. | 709/232 |
| 2007/0239892 A1* | 10/2007 | Ott et al. | 709/242 |
| 2009/0092124 A1* | 4/2009 | Singhal et al. | 370/351 |
| 2011/0090908 A1* | 4/2011 | Jacobson et al. | 370/392 |
| 2013/0031241 A1* | 1/2013 | Schwan et al. | 709/224 |
| 2013/0060962 A1* | 3/2013 | Wang et al. | 709/238 |
| 2013/0185406 A1* | 7/2013 | Choi et al. | 709/223 |
| 2013/0219081 A1* | 8/2013 | Qian et al. | 709/241 |
| 2013/0227048 A1* | 8/2013 | Xie et al. | 709/213 |

OTHER PUBLICATIONS

Foreign Communication From a Counterpart Application, PCT Application PCT/US2013/026716, International Search Report dated Jul. 2, 2013, 4 pages.

(Continued)

*Primary Examiner* — Jerry Dennison
(74) *Attorney, Agent, or Firm* — Conley Rose, P.C.; Grant Rodolph; Brandt D. Howell

(57) ABSTRACT

A named-data networking (NDN) node, comprising a plurality of faces each of which is coupled to a different node in a content-centric network, and a processor coupled to the faces, wherein the processor is configured to probe the performance of each of the faces for an interest, wherein the interest is associated with multiple ones of the faces, wherein a next-hop is identified by the face, wherein a one of the faces associated with the interest is used to forward the interest when the interest is received by the NDN node, and wherein the one of the faces used is determined based on a selection probability determined from feedback from the probe of the performance of the faces.

29 Claims, 8 Drawing Sheets

(56) References Cited

OTHER PUBLICATIONS

Foreign Communication From a Counterpart Application, PCT Application PCT/US2013/026716, Written Opinion dated Jul. 2, 2013, 4 pages.
"CCNx Protocol," http://www.ccnx.org/releases/latest/doc/technical/CCNxProtocol.html, downloaded from the Internet Oct. 18, 2012, 7 pages.
"CCNx Basic Name Conventions," http://www.ccnx.org/releases/latest/doc/technical/NameConventions.html, downloaded from the Internet Oct. 18, 2012, 6 pages.
"CCNx Name," http://www.ccnx.org/releases/latest/doc/technical/Name.html, downloaded from the Internet Oct. 18 2012, 1 page.
"CCNx URI Scheme," http://www.ccnx.org/releases/latest/doc/technical/URI.html, downloaded from the Internet Oct. 18, 2012, 1 page.
"CCNx Content Object," http://www.ccnx.org/releases/latest/doc/technical/ContentObject.html, downloaded from the Internet Oct. 18, 2012, 3 pages.
"CCNx Algorithm Use," http://www.ccnx.org/releases/latest/doc/technical/CryptographicAlgorithms.html, downloaded from the Internet Oct. 18, 2012, 2 pages.
"CCNx Interest Message," http://www.ccnx.org/releases/latest/doc/technical/InterestMessage.html, downloaded from the Internet Oct. 18, 2012, 6 pages.
"Canonical CCNx Ordering," http://www.ccnx.org/releases/latest/doc/technical/CanonicalOrder.html, downloaded from the Internet Oct. 18, 2012, 1 page.
"CCNx Binary Encoding (ccnb)," http://www.ccnx.org/releases/latest/doc/technical/BinaryEncoding.html, downloaded from the Internet Oct. 18, 2012, 3 pages.
"CCNx Timestamp Format," http://www.ccnx.org/releases/latest/doc/technical/Timestamp.html, downloaded from the Internet Oct. 18, 2012, 1 page.
"Implicit Digest Component," http://www.ccnx.org/releases/latest/doc/technical/DigestComponent.html, downloaded from the Internet Oct. 18, 2012, 1 page.
"CCNx Face Management and Registration Protocol," http://www.ccnx.org/releases/latest/doc/technical/Registration.html, downloaded from the Internet Oct. 18, 2012, 5 pages.
"CCNx StatusResponse," http://www.ccnx.org/releases/latest/doc/technical/StatusResponse.html, downloaded from the Internet Oct. 18, 2012, 1 page.
"CCNx Signature Generation and Verification," http://www.ccnx.org/releases/latest/doc/technical/SignatureGeneration.html, downloaded from the Internet Oct. 18, 2012, 6 pages.
"Staleness Handling in CCNx," http://www.ccnx.org/releases/latest/doc/technical/Staleness.html, downloaded from the Internet Oct. 18, 2012, 1 page.
"Name Enumeration Protocol," http://www.ccnx.org/releases/latest/doc/technical/NameEnumerationProtocol.html, downloaded from the Internet Oct. 18, 2012, 2 pages.
"CCNx Repository Policy Handling," http://www.ccnx.org/releases/latest/doc/technical/RepoPolicies.html, downloaded from the Internet Oct. 18, 2012, 2 pages.
"CCNx Respository Protocols," http://www.ccnx.org/releases/latest/doc/technical/RepoProtocol.html, downloaded from the Internet Oct. 18, 2012, 7 pages.
"CCNx RepositoryInfo Object," http://www.ccnx.org/releases/latest/doc/technical/RepositoryInfoObject.html, downloaded from the Internet Oct. 18, 2012, 2 pages.
"CCNx Synchronization Protocol," http://www.ccnx.org/releases/latest/doc/technical/SynchronizationProtocol.html, downloaded from the Internet Oct. 18, 2012, 7 pages.
"CCNx Create Collection Protocol," http://www.ccnx.org/releases/latest/doc/technical/CreateCollectionProtocol.html, downloaded from the Internet Oct. 18, 2012, 4 pages.
"CCNx Link Messages," http://www.ccnx.org/releases/latest/doc/technical/LinkMessages.html, downloaded from the Internet Oct. 18, 2012, 1 page.
"CCNx DTD," http://www.ccnx.org/releases/latest/doc/technical/dtd.html, downloaded from the Internet Oct. 18, 2012, 3 pages.
"CCNx Main Schema," http://www.ccnx.org/releases/latest/doc/technical/xsd.html, downloaded from the Internet Oct. 18, 2012, 6 pages.
"CCNx Repository DTD," http://www.ccnx.org/releases/latest/doc/technical/repository.dtd.html, downloaded from the Internet Oct. 18, 2012, 1 page.
"CCNx Repository Schema," http://www.ccnx.org/releases/latest/doc/technical/repository.xsd.html, downloaded from the Internet Oct. 18, 2012, 2 pages.
"CCNx Sync DTD," http://www.ccnx.org/releases/latest/doc/technical/sync.html, downloaded from the Internet Oct. 18, 2012, 1 page.
"CCNx Sync Schema," http://www.ccnx.org/releases/latest/doc/technical/sync.xsd.html, downloaded from the Internet Oct. 18, 2012, 2 pages.
"CCNx DTAG Values," http://www.ccnx.org/releases/latest/doc/technical/DTAG.html, downloaded from the Internet Oct. 18, 2012, 5 pages.
Di Caro, Gianni, et al., "AntNet: Distributed Stigmergetic Control for Communications Networks," IRIDIA, Universite Libre de Bruxells, Journal of Artificial Intelligence Research 9, Dec. 1998, pp. 317-365.
Di Caro, Gianni, et al., "Ant Colony Optimization and its Application to Adaptive Routing in Telecommunication Networks," Dissertation presentee on vue de l'obtention du grade de Docteur en Sciences Appliquees, Universite Libre De Bruxelles, Faculte des Sciences Appliquees, Sep. 2004, 374 pages.
Jacobson, Van, et al., "Networking Named Content," ACM, CoNEXT '09, Rome, Italy, Dec. 1-4 2009, pp. 1-12.
Shanbhag, Shashank, et al., "SoCCeR: Services over Content-Centric Routing," ACM, ICN '11, Toronto, Ontario, Canada, Aug. 19, 2011, 6 pages.
Zhang, Lixia, et al., "Named Data Networking (NDN) Project," NDN-0001, Oct. 20, 2010, 27 pages.
Yi, Cheng, et al., "Adaptive Fowarding in Named Data Networking," ACM SIGCOMM Computer Communication Review, vol. 42, No. 3, Jul. 2012, pp. 62-67.
Sim, Kwang Mong, et al., "Ant Colony Optimization for Routing and Load-Balancing: Survey and New Directions," IEEE Transactions on Systems, Man, and Cybernetics—Part A: Systems and Humans, vol. 3, No. 5, Sep. 2003, pp. 560-572.
Karn, Phil, et al., "Improving Round-Trip Time Estimates in Reliable Transport Protocols," ACM SIGCOMM, Computer Communication Review, 1988, pp. 67-74.

\* cited by examiner

METHOD AND APPARATUS FOR ADAPTIVE FORWARDING STRATEGIES IN CONTENT-CENTRIC NETWORKING

CROSS-REFERENCE TO RELATED APPLICATIONS

The present application claims the benefit of U.S. Provisional Patent Application No. 61/601,321 filed Feb. 21, 2012 by Haiyang Qian et al. and entitled "Method and Apparatus for Adaptive Forwarding Strategies in Content-Centric Networking," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content-oriented network (CON), a content-centric network (CCN), an information-centric network (ICN), which collectively may be referred to as named-data networks (NDNs), a content router is responsible for routing user requests and content to proper recipients. In the NDN, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In NDNs, content delivery including publishing, requesting, managing (e.g., signature, verification, modification, deletion, etc.) may be based on content name and not content location. One aspect of NDNs that may be different from traditional Internet Protocol (IP) networks is the ability of NDNs to interconnect multiple geographical points and cache content temporarily or store content on a more persistent basis. This may allow content to be served from the network instead of an original server, and thus may substantially improve user experience. The caching/storing may be used for real time data that is fetched by the user or for persistent data that belongs to the user or to a content provider, e.g., a third party provider.

A forecast from Cisco Visual Networking Index shows that in 2015, the Internet will deliver 7.3 petabytes of movies every 5 minutes. However, the Internet was designed based on a host-to-host model, not for content delivery which requires support of one-to-many and many-to-many delivery. Moreover, an IP network has limited support for functions mobility, and security. Often, the Transmission Control Protocol (TCP) session gets timed-out when the device is mobile and undergoes a handoff. The service interruption occurs either due to a change in the IP address or issues such as network congestion. Furthermore, the forecast from Cisco shows that the traffic from wireless devices accessing the Internet will exceed the traffic from wired devices by the year 2015.

It should be noted that for purposes of this disclosure, the terms, CON, CCN, ICN, and NDN may be used interchangeably since the disclosed methods, systems, and apparatuses may be applied and incorporated into each.

SUMMARY

In one embodiment, the disclosure includes a named-data networking (NDN) node, comprising a plurality of faces each of which is coupled to a different node in a content-centric network, and a processor coupled to the faces, wherein the processor is configured to probe the performance of each of the faces for an interest, wherein the interest is associated with multiple ones of the faces, wherein a next-hop is identified by the face, wherein a one of the faces associated with the interest is used to forward the interest when the interest is received by the NDN node, and wherein the one of the faces used is determined based on a selection probability determined from feedback from the probe of the performance of the faces.

In another embodiment, the disclosure includes a method in a network node for forwarding data in a content centric network, comprising associating an interest with multiple faces in the network node, probing with a processor each of the faces with a probe interest corresponding to the interest to determine the performance of each of the faces, and updating a selection probability entry for an interest in a forwarding information base (FIB) based on the feedback from probing the faces.

In another embodiment, the disclosure includes a network node, comprising a plurality of faces each providing a communication path to a corresponding node, a control plane routing level wherein multiple faces are associated with a prefix of a content name corresponding (in terms of longest match) to an interest, a probe engine to probe the interest for each of the multiple faces, and a forwarding layer comprising strategy information to determine which one of the multiple faces to use for forwarding an incoming interest corresponding to the prefix, wherein the strategy information is determined based on results of the probe.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
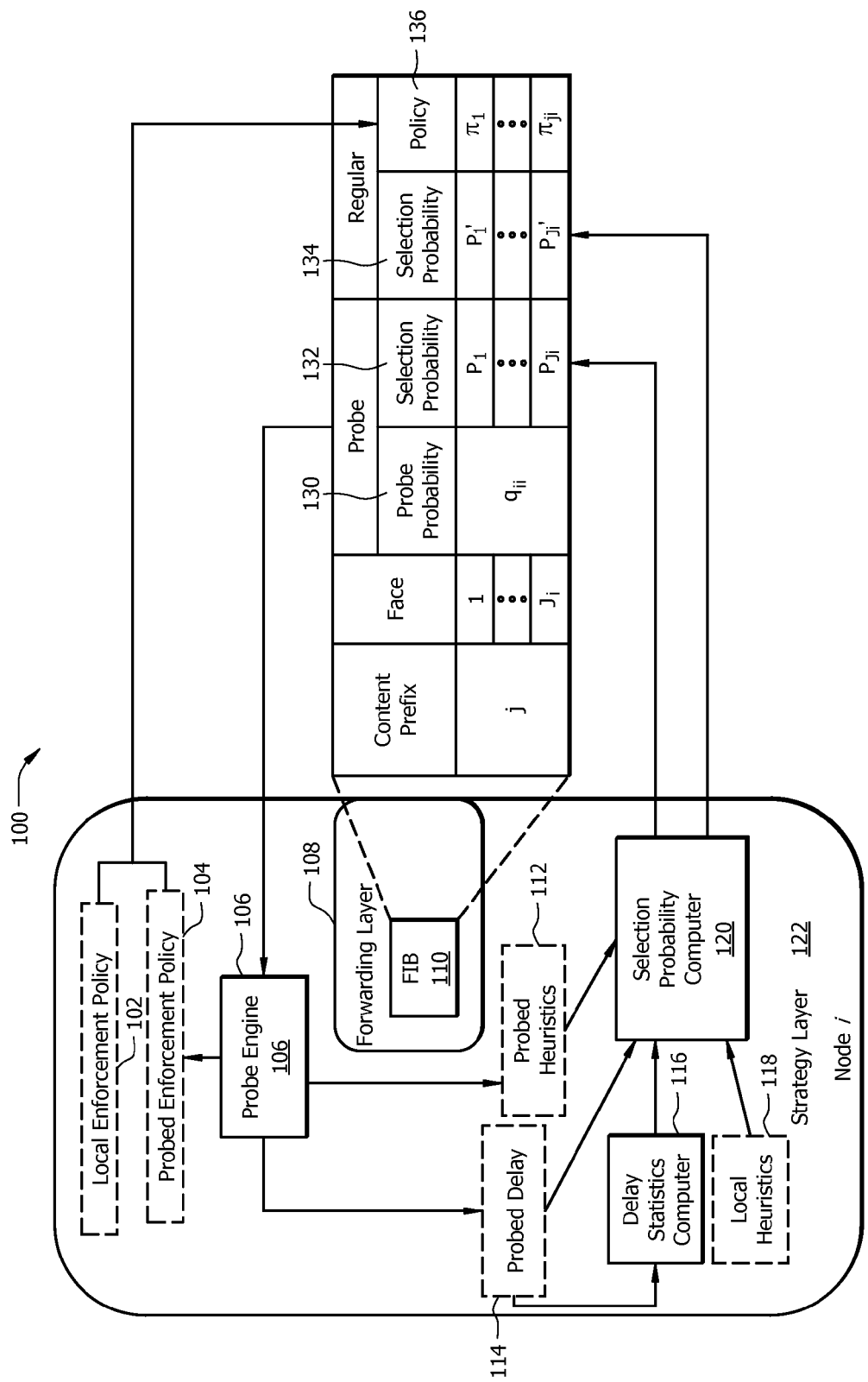
FIG. 1 is a block diagram of an exemplary network node depicting functional modules in the forwarding plane (comprised of forwarding and strategy layers) of a node in accordance with a disclosed embodiment.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

NDN addresses the problem of information dissemination by routing on names that identify content objects, disassociating the content object from the content object's location. An NDN router may have a Pending Interest Table (PIT), a Forwarding Information Base (FIB), and a Content Store (CS). An NDN-enabled device may look for the closest copy of content by multicasting the interest packets with the content name into the network. Content may reside in any host at the producers end or may be cached in CSs of the NDN-routers. This feature allows users to retrieve the same content without introducing replicated traffic into the network. As long as some users have retrieved the content, the content may be cached in the network and may be fetched by any number of users.

One technical challenge for NDN is that of content placement and dissemination in the network considering a significant fraction of the content is dynamic and unpredictable in nature in terms of its popularity. For example, when a user requests to retrieve named content, the user does not know who may have asked for the same content beforehand. In addition for unknown content locations and dynamic traffic situations, such as in an ad-hoc wireless network like a vehicle-to-vehicle network, the situation introduces certain dynamics due to the mobility changes and the varying air-link quality. Unpredictable dynamics in NDN networks create a dilemma to the content router as to which is the best direction to forward the "interest" for the desired content. The challenge leads to a "strategic layer" design that implements opportunistic intelligence functions and algorithms to help the content router to determine an optimal/sub-optimal route for content retrieval and data forwarding in the NDN.

Loop free data forwarding in NDN provides the flexibility of selecting interfaces (or faces) from the list of faces for a certain prefix in FIB and is an inherent virtue of NDN. The terms interface, face, and port may be used interchangeably herein. How to utilize this feature is left to the strategy layer in "Networking Named Content," CoNEXT'09, ACM, Rome, Italy, 2009, pp. 1-12 by Jacobson, et al., which is incorporated herein by reference as if reproduced in its entirety. There may be two implementations of forwarding strategies that may represent two extremes. A first implementation may be to broadcast interest via all faces at the same time where the data returned from the fastest faces is accepted and the data returned from other faces is discarded. This way, the fastest face is automatically used and delay perceived by the CCN router is minimized. In addition, the goals of being resilient to network failure and adaptive to network condition changes may be achieved. However, this naïve technique introduces an inordinate amount of copies of interest and data into the network. Multiple copies of data consume bandwidth, increase the network delay, and cause energy inefficiency. The second implementation may be to unicast interests to a randomly selected face where only one copy of an interest and data is transmitted in the network. However, there may be no mechanism to guarantee that the selected face yields the best performance, e.g., minimal delay, load balancing. Therefore one possible solution may combine the advantages of the two extreme cases.

Disclosed herein are methods, systems, and apparatuses that advance forwarding strategies for NDN beyond what exists today. Disclosed herein is strategic data forwarding layer for NDN using intelligent opportunistic-enabled algorithms and protocols. The disclosed strategic layer may be expected to show better results than the prior art. In addition, state-of-the-art technologies may be leveraged to implant the disclosed forwarding strategies on production routers. Also disclosed herein is a method, system, and apparatus to unicast the interest to the face which has the least delay (probabilistically) at the current moment, while at the same time exploring other potential better paths. This way, the delay may be minimized and the number of copies of data for each request may be minimized in the network. Towards this end, more control functionalities may be added. In addition, the selection preference in the strategy layer may be adaptive to changes in network conditions. In this disclosure, the terminology "network condition" may refer to all factors that have influence on the performance perceived by the routers. For example, such factors may include changes to network topology, node/link failure situations, traffic pattern, traffic load, content distribution. In addition to these factors, the content distribution in NDN is also prone to change due to caching and the NDNs caching management policies. Hence the network condition may be more dynamic in NDN than that in an IP network. The disclosed methods, systems, and apparatuses may make the forwarding strategy aware of the changes of network condition.

A relationship between routing and forwarding strategy in NDN is described below. In an IP network, the routing plane may be responsible to find the shortest path and the forwarding plane simply follows it. However, in NDN, the forwarding plane may be equipped with a partial/full distributed or centralized strategy plane to make forwarding intelligent decisions in real time. In this case, the routing plane's role may be limited to achieve prefix reachability and react to coarse time granularity (of the order of tens of seconds) changing network conditions, such as, a long-term network topology change. For instance, for a given prefix, the routing plane may be populated with a list of faces by a K-shortest path routing algorithm; and a forwarding strategy may select face(s) from this list to react to the network condition changes in a fine time granularity (of the order of a few Round-Trip Time (RTT)). Therefore, the response to network condition changes performed by a forwarding strategy may be more agile than that of the routing plane. Due to the dynamics of NDN, it may be worthwhile to have this two level "routing" mechanism: one at the control plane routing level wherein multiple faces are associated with each prefix and the other at the forwarding plane where the strategy level decisions influence the decision on the subset of faces to use for the incoming interest based on its own sense of the network states for both wireline and wireless networks.

In this disclosure, parallel-forwarding is referred to as multicasting and sequential mode of interest forwarding is referred to as unicasting, which may mimic the fail-and-try behavior. In the CCNx implementation, a sequential forwarding strategy is implemented. Additional information concerning PARC's CCNx implementation may be found in "The NDN Project Team Named Data Networking (NDN) Project," PARC Technical Report, NDN-001, October 2010, both of which are incorporated herein by reference as if reproduced in its entirety. In PARC's CCNx implementation, a random number may be generated as the initial value of the prediction time of RTT. If the content is returned from the same face as previous, the predicted time may be stringently decremented by a value until a time out occurs, then the next face in the face list may be tried and the predicted time may be increased. In this way, the utilization of faces may be proportional to the delay of the faces, that is, the face introducing lowest delay may be utilized the most. However, this method still may not distinguish faces when their delay is close and its adaptability to the changing network conditions may not be agile enough.

In an embodiment of this disclosure, the forwarding strategies may be aided by probing other potential paths. The probing functionality may be responsible for finding a best face in terms of a predefined metric, e.g., delay by learning the network conditions (this may be referred to as "reinforcement learning" in machine learning jargon). Although, in an embodiment, the performance metric used for the disclosed forwarding strategy is delay, the disclosed methods, systems, and apparatuses may be easily extended to include other performance metrics as well as described in more detail below. The forwarding functionality may follow the decision made by probing functionality. The disclosed forwarding functionality may be agile to network condition changes and may pose very little traffic overhead to the network. In addition, the traffic may be well balanced automatically by probabilistic forwarding. The disclosed methods, systems, and apparatuses have the flexibility to satisfy performance requirements by adjusting the strategies and adapting the strategies to various network situations both wireline and ad-hoc situations. For example, in an embodiment, the interest may be forwarded to more than one face at the same time to improve the delay and reliability by trading off the network traffic load.

In embodiment, at each NDN node, the next-hop may be identified by the face. Functionally, a special interest/data may be used to probe the performance (e.g., delay) of the faces. Efficient algorithms that consume very little Central Processing Unit (CPU) time may be used to update the selection probability for each face according to the feedback from probe interest/data. Interests may be sent probabilistically according to the selection probability.

FIG. 1 is a block diagram of an exemplary network node 100 depicting functional modules in the forwarding plane of the node 100 in accordance with a disclosed embodiment. Node 100 may comprises a forwarding information based (FIB) 110 in a forwarding layer 108, a selection probability computer (SPC) 120, a probe engine (PrE) 106, and a delay statistics computer (DSC) 116. The node 100 may comprise two sub-layers: one is the strategy sub-layer 122 which manages the forwarding policy and the other is the forwarding sub-layer 108 which may comprise the FIB 110 implementing the policies of the strategy layer 122. Compared to current CCN proposals, the FIB 110 may be modified to maintain a probing probability 130 for each prefix, a selection probability 132 per face for a probe, and a probability 134 per face and associated policies 136 for regular interest forwarding. PrE 106 takes care of sending probe interests, receiving probe data, and post-processing on them. Based on the desired tradeoff between efficiency and overhead, there are at least three manners in which the probes may be used. In a first manner of use, the probes may only be injected by the edge nodes and core nodes leverage these probes for tuning interest forwarding for the prefixes in the core nodes' FIB. Edge nodes are nodes at the edge of a domain that are coupled to nodes inside the domain. In a second manner of use, besides the edge nodes, probes may also be injected by the core nodes. In this case, each node may use its probe to update its forwarding policies. A third approach is to use a combination of the above two cases where all nodes also leverage the probes injected by each other to tune their local forwarding policies.

PrE 106 may use forwarding frequency and selection probability for probe interest to generate probe interests. PrE 106 processes the information returned back from probe data and sends latest probed delay to the SPC 120 as well as to the DSC 116. In the meantime, PrE 106 informs the SPC 120 about probed heuristics 112. The computation and update of selection probability 132 and 134 is performed by the SPC 120. The SPC 120 uses statistics of the delay, latest probed delay (adjusted by probed heuristics 112) and local heuristics 118 to compute a selection probability 132. Approaches used to compute selection probability are provided later in this document.

To practically implement the methods of this disclosure in various NDN environments, the tunable parameters that determine the schemes properties related to network stability, overhead and efficiency are summarized in Table 1 below. These parameters may be adjusted (or tuned) to optimize the performance of the disclosed adaptive forwarding strategy in different NDN environments.

TABLE 1

A list of tunable parameters

| Notation | Range | Description |
| --- | --- | --- |
| $\alpha$ | [0, 1] | Weight governing the new arrival and weighted accumulated arrivals to compute probe probability for a prefix in the independent mode |
| $\eta$ | [0, 1] | Weight per face per prefix governing latest probed and history metrics to update mean and variance of the metric for a face of a prefix |
| $\phi$ | (0, 1] | Parameter adjusting the window size of the observation to evaluate the stability of the network for a face of a prefix |
| $\beta$ | [0, 1] | Weight governing the goodness of probed metric and network stability for a face of a prefix |
| $\epsilon$ | $(1, \infty)$ | Parameter tuning the degree of depressing low probabilities when computing selection probability for regular interests for a face of a prefix |
| $\rho_m$ | [0, 1] | Weight of different metrics when computing composite metric for a face of a prefix |
| $\gamma$ | (0, 1) | The threshold of reinforcement cannot exceed for a face of a prefix |
| $\pi$ | (0, 1) | The threshold of selection probability cannot exceed for a face of a prefix |

Next, the manner in which probe interests are generated, handled by intermediate node and the way delay is calculated using the probe interests and related data-responses is described. A node in the network is denoted by $i, i \in \mathcal{I} = \{1, 2, \ldots, I\}$ A content prefix in node i is denoted by $j, j \in \mathcal{J}_i = \{1,$ 2, ..., $J_i$}. A face for prefix j at node i is denoted by k, k∈ $\mathcal{K}_{ij}$={1, 2, ..., $K_{ij}$}. That is, $\mathcal{K}_{ij}$ is the set of faces that can be forwarded to for prefix j at node i, Further the statistics for prefixes can be managed at any level. The subscript for the face and node (i.e., $_{ij}$ in $k_{ij}$) is omitted for the sake of brevity. Unless stated otherwise, subscripts are used to represent nodes, content prefixes, and faces. Also, unless stated otherwise, the time label is represented in a pair of parentheses following the variable. The tunable parameters are named by Greek alphabet. Exceptions are made for mean and variance notations to conform to the conventions.

There may be two modes to initiate probe interests. The first mode is where the PrE 106 initiates a probe interest independently of the regular interest. Here, the objectives of the probe interest packets are not to fetch the content but to find an efficient path to the content. This may be referred to as the independent mode. The other mode is to sample the incoming interest traffic and use the incoming interest traffic to probe other paths. This mode may be referred to as the dependent mode. The following further described the independent mode.

The prefixes that match the incoming interest traffic may be probed more frequently; generally the granularity of the probed prefix could be at any level. Therefore the probing probability for prefix j should be proportional to the frequency that prefix j is consulted to propagate since probing probability directly reflects the frequency of the FIB 110 lookup. Note that this frequency of consulting the FIB 110 may not (in most cases, it is not since popular content tend to be stored in CS) directly relate to the content popularity. A probe frequency may be added to the FIB 110. In one implementation, a counter may be kept for each prefix and an appropriate weighted moving average used to adjust the counter. In an example, an exponentially weighted moving average (EWMA) may be used such that weight for a previous counter decrease exponentially. Let Δt be the time interval between two continuous forward requests for prefix j at node i. Because the interval is not deterministic, the notation of Δt may be used to represent the time interval between two events in this disclosure. Let $c_{ij}(t)$ be the immediate previous forward counter for prefix j; then the next forward counter, $c_{ij}(t+\Delta t)$ is updated by:

$$c_{ij}(t+\Delta t)=\alpha \times c_{ij}(t)+(1-\alpha),$$

where α is the decreasing weight of previous weighted accumulative counter. And the counter for all the other prefixes in node i is updated by:

$$c_{ij'}(t+\Delta t)=\alpha \times c_{ij'}(t), j' \in J_i \backslash j$$

Updating the prefix probing probability may be at different granularities. For example, it can be updated every one consultant on a prefix every 10 consultant on a prefix. The prefix probe probability is calculated by normalizing the latest counter (denoted by $c_{ij'}$) over the sum of the counters of all prefixes in node i:

$$q_{ij} = c_{ij} \bigg/ \sum_{j' \in \mathcal{J}_i} c_{ij'}$$

The frequency of initiating a probe interest may be tuned based on network stability. For a stable network, the frequency should be relatively low while for an unstable network, the frequency should be relatively high. The probe interest may be probabilistically unicasted via a face according to the selection probability for a face, probabilistically multi-casted via multiple faces according to the selection probabilities for faces, or broadcast via all faces deterministically. These three options are called unicast, multicast and broadcast options, respectively. In the order of unicast, multicast and broadcast, the traffic overhead increases while the sensitivity (adaptively) to network conditions improves. The broadcast mode may be used for explore new paths. In dependent mode, the probe activity adapts to the prefix forwarding frequency and incurs no overhead to the network. Prefix probe probability is not used in dependent mode.

Figure 2:
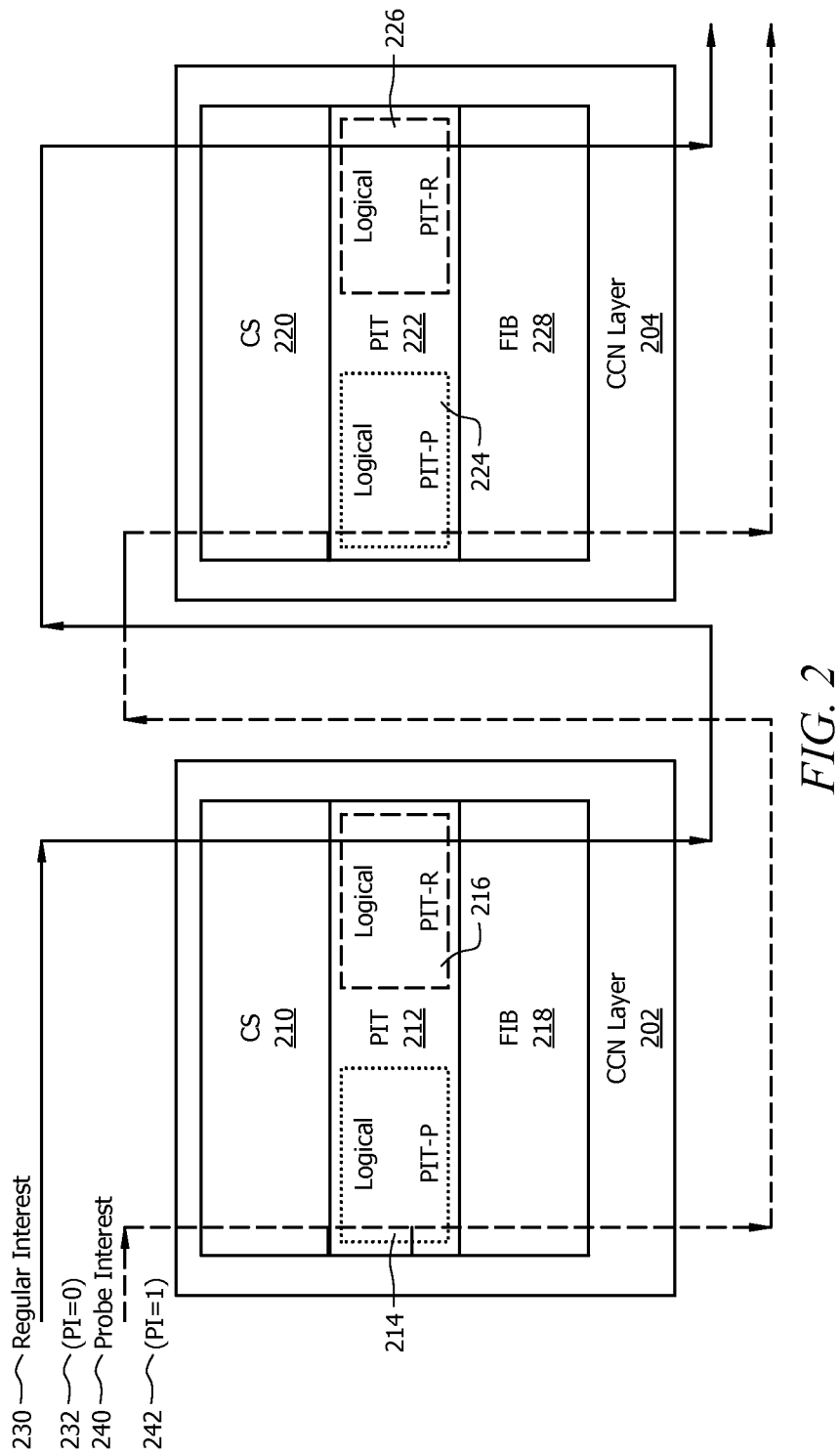
FIG. 2 is a diagram illustrating how regular and probe interests are handled at an NDN layer in the independent mode in accordance with a disclosed embodiment.

FIG. 2 is a diagram illustrating how probe and regular interests are handled at NDN (CCN) layer in the independent mode in accordance with a disclosed embodiment. In independent mode, a marker (e.g., a bit) may be used in the interest/data to identify the interest/data as a probe. This bit may be referred to as a Probe Identifier (PI) 232, 242. If the PI 242 is set, the interest/data is a probe interest/data 240. If the PI 232 is unset, the interest/data is a regular interest/data 230. The sequence of checking the CS 210, 220, the PIT 212, 222, and the FIB 218, 228 for the probe follows the sequence detailed in "Networking Named Content," by Jacobson, et al., CoNEXT'09, Rome, Italy, ACM, 2009, pp. 1-12, hereinafter "Jacobson," which is incorporated herein by reference as if reproduced in its entirety. Upon receiving an interest 230, 240, the CS 210, 220 is checked for an exact match. If the content is available, the CS 210, 220 sends the requested data. Otherwise, the CCN layer in the node 202, 204 checks the PIT 212, 222 by exact match to know whether another interest for the same content is still active. If so, the incoming face is added to the matching PIT 212, 222 entry. If no PIT 212, 222 entry is found, a new entry is created in the PIT 212, 222 and the interest packet 230, 240 is forwarded by consulting FIB 218, 228 and corresponding forwarding policy for the prefix. There are at least two differences on handling the probe interest 240 and the regular interest 230. One is that the probe interest 240 and the regular interest 230 for the same prefix have their own PIT entries 214, 216, 224, 226. In an embodiment, the two PIT entries 214, 216, 224, 226 may also be logically separated for efficient implementation. As shown in FIG. 2, the PIT entries 214, 216, 224, 226 for the probes can be logically separated in the PIT 212, 222 using the PI 232, 242 marking (interests that have been marked as a Probe Identifier (PI) using the PI bit). Hence the PIT 212, 222 may now be seen to have different tables for regular interests 230 and probe interests 240. The PIT 212, 222 for probe interests 240 and regular interests 230 are specified by PIT-P 214, 224 and PIT-R 216, 226, respectively. For a probe interest 240, the data returned does not contain the real data payload to save bandwidth. This data type is called probe-data. When a router receives a probe-data, the CS 210, 220 is not updated. Only the time at which the probe-data is received is recorded by PrE. As described herein, the term "regular" is omitted from "regular interest/data" unless ambiguity rises or emphasis is needed. Note that in the described embodiment, one interest to one data paradigm is maintained in the NDN to maintain flow balance.

In dependent mode, the sampled interest/data is identified by the PI bit as well. The sampled interest/data is treated the same as regular interest/data except the sending and receiving time is recorded by PrE.

If a probe-interest belonging to either an independent or a dependent mode of operation is propagated to an upstream node and the upstream node does not have the content as well, the value of PI is inherited and further propagated to upstream nodes.

Figure 3:
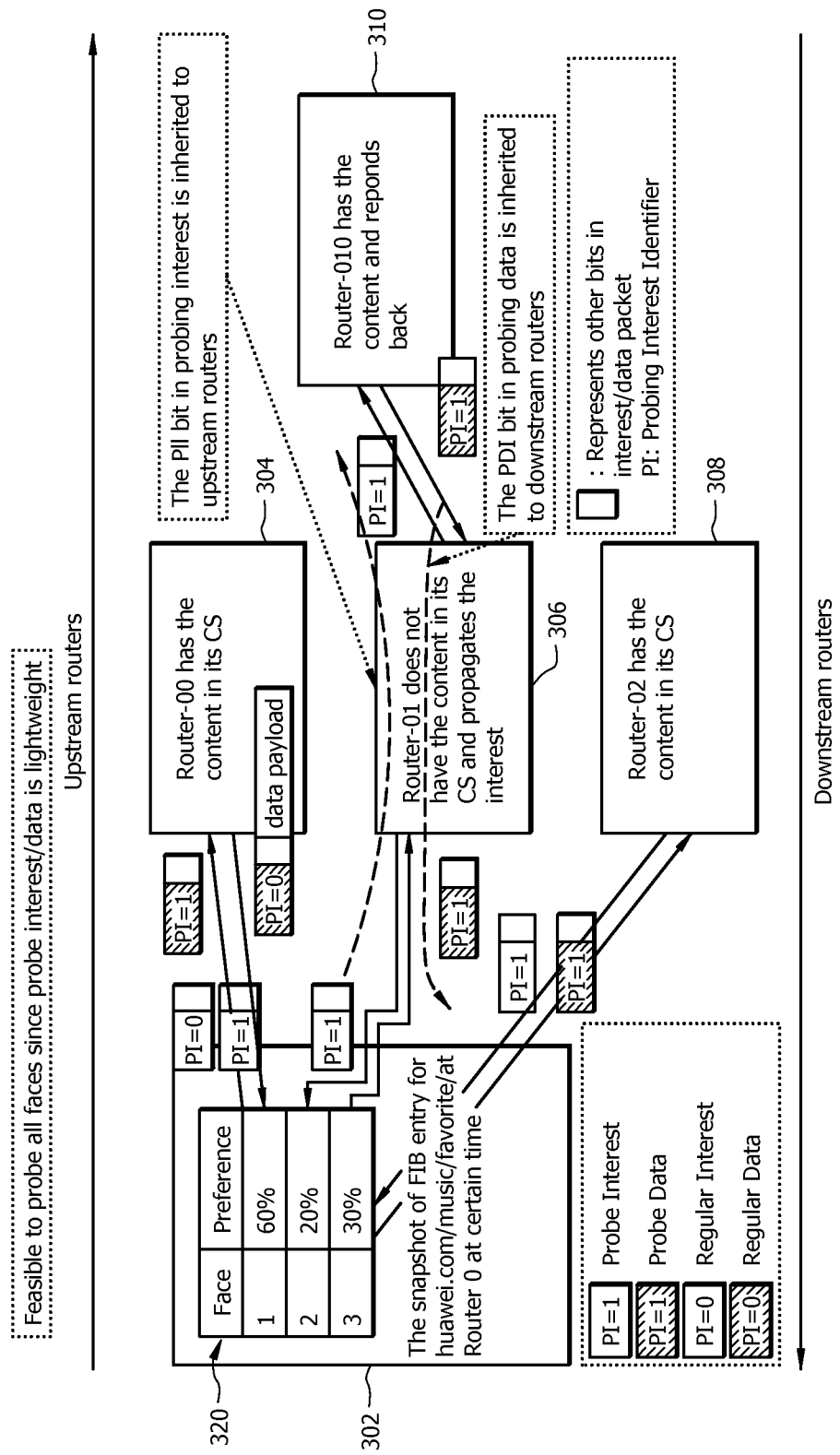
FIG. 3 is a diagram depicting an example of propagating probe/regular interests and sending probe/regular data in the independent mode with the broadcast option in accordance with a disclosed embodiment.

FIG. 3 is a diagram depicting an example of propagating probe/regular interests and sending probe/regular data in the independent mode with broadcast option in accordance with a disclosed embodiment. The dependent mode may act similarly. In the example, the interest on huawei.com/music/favorite is expressed from router-0 302. At an instant in time, the FIB 320 entry for huawei.com/music/favorite/ in router-0 302 may indicate that face 1 is used 60% of the time, face 2 is used 10% of the time and face 3 is used 30% of the time, where face 1 is the interface with router-00 304, face 2 is the interface with router-01 306, and face 3 is the interface for router-02 308. To probe the performance of faces, the PE of router-0 302 sets the PI bit in the interest and selects all faces to probe. Once the upstream routers 304, 306, 308 receive the probe interest, the probe interest goes through the standard procedure of interest processing. Because the CS of the router 304, 308 has the content, the router 304, 308 responds with probe-data. Since the router 306 does not have the content, it checks the PIT. If the entry exactly matches with an entry in the PIT-P, the requesting face is added to requesting face list of the entry in the PIT-P of the router 306. If this entry is not found in the PIT-P of router 306, a new entry is created in the PIT-P of the router 306 and the FIB of the router 306 is consulted. If there is a longest match entry in the FIB, the probe interest is further propagated to router-010 310 according to the forwarding strategy and the PI is inherited. It may be feasible to probe all faces in independent mode since the probe interest/data is lightweight. Probe-data may also be utilized to carry other information that may be collected from the data source node or any other nodes en route.

Figure 4:
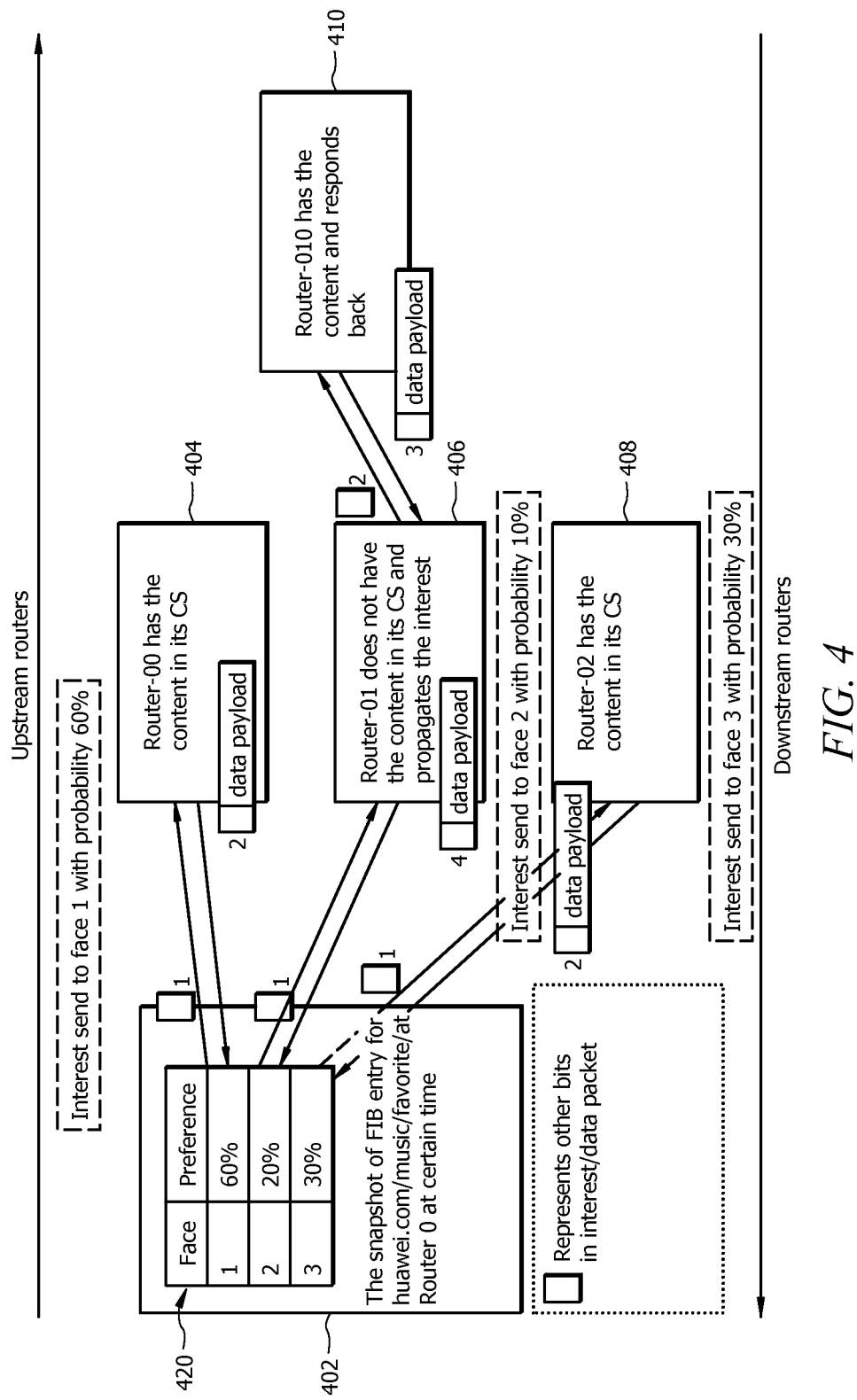
FIG. 4 is a diagram depicting an example of propagating probe/regular interests and sending probe/regular data in the dependent mode in accordance with a disclosed embodiment.

FIG. 4 is a diagram depicting an example of propagating probe/regular interests and sending probe/regular data in the dependent mode with broadcast option in accordance with a disclosed embodiment. In dependent mode, time stamp data indicating the length of time an interest takes to reach a router and return from the router are obtained from regular interest and regular data. This mode does not incur any overhead since no additional interests or data are inserted into the network. However, the accuracy of the information about the faces at a given instant in time may not be as great since some faces (and its corresponding upstream routers) are probed less often due to the FIB 420 entries in router-0 402 indicating the face 1 is used 60% of the time, face 2 is used 10% of the time and face 3 is used 30% of the time where face 1 corresponds to router-00 404, face 2 corresponds to router-01 406, and face 3 corresponds to router-02 408. Thus, interests are sent router-00 404 60% of the time, to router-01 406 10% of the time, and to router-02 408 30% of the time. In this example, both router-00 404 and router-02 408 have the content corresponding to the interest in the CS of the respective router-00 404 and router-02 406. The CS for router-01 406 does not contain the content and thus, the interest received by router-01 406 is firstly exact-matched with the PIT. If there is a match, updated the matched PIT entry. If there is no match in the PIT, create a new PIT entry and check the FIB. By finding a longest match in the FIB, the interest is forwarded to router-010 410 which does contain the data in the CS of router-010 410. The cases for uni-cast and multi-cast options are similar.

Table 2 summarizes the pros and cons of Independent Mode and Dependent Mode. Generally speaking, in either an unstable network or with non-stationary traffic, as the probe frequency increases, accuracy increases, but overhead also increases. Thus, there is a tradeoff between performance and network overhead. It is important to keep in mind that more network overhead burdens the network load and increases delay.

TABLE 2

The pros and cons of Independent Mode and Dependent Mode

|  | Independent Mode | Dependent Mode |
| --- | --- | --- |
| PIT Size | 2 X | 1 X |
| Overhead to the Network Traffic | Yes (Depends on Probing Frequency) | Almost None |
| Adaptive to Network Stability | Tunable (tradeoff with traffic overhead) | Bad (awkwardly in line with forward pattern NOT with network stability) |
| The Need to calculate Forward Probability | Yes | No |
| The need to compute Selection Probability | Yes | Yes |
| Tunable Parameters | Probing Frequency (tunable to in line with network stability); Unicast/Multicast/Broadcast Options* | Sampling Rate (NOT in line with network stability); Unicast/MultiCast/Broadcast Options** |

*In the order of unicast, multicast and broadcast, the traffic overhead introduced to the network increases while the sensitivity (adaptivity) to network condition improves. Use of these options is independent of the way regular interests are casted.
**The use of Unicast/Multicast/Broadcast options causes the regular interests to be casted in the same way.

Figure 5:
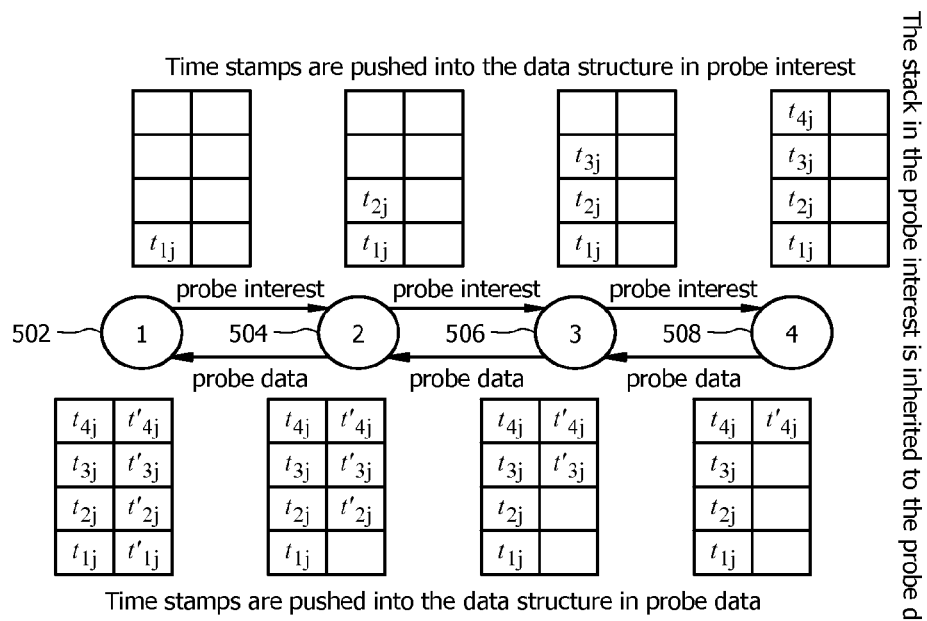
FIG. 5 is a diagram illustrating an exemplary manner of recording time stamps during interest propagation and data return in accordance with a disclosed embodiment.

Next, the manner in which the "raw" RTT is obtained for the node initiating probe interests and also for nodes in the path from initiator to data source is described. A difference between AntNet (Di Caro, 2004) and this disclosure is highlighted. The manner of how time stamps are recorded during interest propagation and data return is described using the example in FIG. 5. Let $t_{ij}$ be the time stamp of probe-interests while $t'_{ij}$ is the time stamp of the probe-data received at node i for prefix j. As shown in the upper part of FIG. 5, a probe interest may be initiated by node-1 502 and the time stamp of initiating the probe-interest, $t_{1j}$, may be recorded in the data structure maintained in the probe interest. At node-2 504, node-3 506, and node-4 508, the probe-interest is propagated and the time stamps of receiving the probe interests are recorded in the same data structure. When the probe interest reaches the node which has the content (e.g., node-4 508 in FIG. 5), the probe interest is transformed into probe data and the data structure in the probe interest is inherited by the probe data. At the lower part of FIG. 5, the probe data follows exactly the same path as the probe interest due to the inherent design of CCN. The time stamp of initiating the probe data, $t'_{4j}$, may be recorded by the same data structure at node-4 508. If the processing time from receiving probe interest to initiating probe data is negligible, then $t_{4j}=t'_{4j}$. The time stamps of receiving the probe data are recorded in the data structure at node-3 506, node-2 504, and node-1 502 along with the path probe data returning.

The probed delay for content j at source node s, which is equivalent to the round trip time from source node s to destination node d, is calculated by:

$$d_{sj}=RTT_{sd}=t'_{sj}-t_{sj}$$

In addition, because each node autonomously selects the face (according to selection probability), the delay for the same content j at intermediate node i en route to the destination node d is calculated by:

$$d_{ij}=RTT_{id}=t'_{ij}-t_{ij}, i \epsilon P_{sd},$$

where $P_{sd}$ denotes the set of all nodes in the path from s to d inclusively. For node d, it is the processing time from receiving the interest to initiating the data. This delay for intermediate nodes to the destination may be collected to update the selection probability (a node CPU may compute the selection probability) since these nodes may leverage the probe originated by node i. Note that due to the location diversity of the content, the dynamics of NDN, and probabilistic selection, these nodes may not be in the path towards content for following regular interests from node s. There are at least three alternatives in terms of which node should send probe interests: 1) only edge nodes send probe-interest and core nodes leverage the probe interest sent by edge nodes; 2) all nodes send probe interest autonomously and do not leverage the probe interest from others (that is, the selection probabilities of nodes on the path are not updated); and 3) all nodes probe and also leverage other probe interests. The best alternative may depend on the specific network setup.

The above calculated delay is based on the assumption that the content corresponding to the probe-interest is not cached in any node in the path towards the content. That is a host-oriented measurement. However, this assumption does not hold if the data is cached during the time between sending the probe-interest and receiving the response. Furthermore, this is only true for the dependent mode since in the independent mode, the probe data does not contain actual data. If the data is cached in any of the downstream nodes other than the one responding to the probe-interest, the following modification may be used. Let $s_{ij}$ denote if content j is stored in node i. The information recorded in the probe data becomes a 2-tuple: $<t'_{ijk}, s_{ij}>$. Then, $s_{dj}=1$ since the destination node is known to have the data at the moment when the probe happens. The probed delay for content j is adjusted as:

$$d_{ij}=RTT_{ii'}=RTT_{id}-RTT_{i'd}=(t'_{id}-t_{id})-(t'_{i'd}-t_{i'd}), i'=\arg\min_{i'' \in P_{sd}}\{s_{i''j}=1\},$$

Where $\arg\min_{i'' \in P_{sd}}\{s_{i''j}=1\}$ returns the node storing the requested data and that is closest to source node s. The source-destination node may be used to illustrate a specific process of probe interest propagation and probe data returning. It is important to keep in mind that what is being requesting is specific named content and not specific IP-addressed nodes.

An algorithm to compute and update the face selection probability may be characterized by "AAAA" properties:
1) Accurate: The path quality may be inferred in a probabilistic sense.
2) Agile: The algorithm may be sensitive to network condition changes (traffic pattern, bandwidth utilization, link/node failure, etc.) to a certain extent.
3) Adept: The computation and update of a selection preference should be fast enough to prevent the selection preference from being stale and the overhead due to the probe-interest and the probe-data should be minimized.
4) Adaptive: Since the NDN network conditions are dynamic (e.g., driven by user behavior the traffic may fluctuate) and objectives inherently contradictory (e.g., more frequently sending probe interests improves accuracy of the preference but takes more bandwidth at the same time), the algorithm should provide tunable parameters to network operators to suit their requirement.

Each entry in the FIB (or entries inheriting from it) may maintain the mean and variance of the delay ($\mu_{ij}$ and $\sigma_{ij}$) such that the information of average delay and stability of delay is known. Upon receiving the probe data from arbitrary face k, the FIB updates $\mu_{ij}$ and $\sigma_{ij}^2$ for prefix j. Previous and latest information may be differentially weighted by using a moving window. In an embodiment, EWMA may be adopted, as used to compute the frequency of consulting FIB. Let $\mu_{ij}(t)$ be the mean at time t for entry j at router i and $\mu_{ij}(t+\Delta t)$ be the updated mean when next probe data returns, say time $t+\Delta t$. Assuming the probe data comes from face k, the delay probed at time $t+\Delta t$ be $d_{ijk}(t+\Delta t)$, the update for the mean of the delay may be computed as follows:

$$\mu_{ij}(t+\Delta t)=\eta \times d_{ijk}(t+\Delta t)+(1-\eta)\times \mu_{ij}(t)$$

where $\eta$ can be proportional to the elapsed time since last update since the more time elapsed the less we should trust history information or $\eta$ can simply be a constant. Similarly, the update for variance may be computed as follows:

$$\sigma_{ij}^2(t+\Delta t)=\eta \times (d_{ijk}(t+\Delta t)-\mu_{ij}(t))^2+(1-\eta)\times \sigma_{ij}^2(t).$$

The statistics model of a certain prefix in a certain router may be updated by all probe data (regular data in dependent mode) from all faces for that prefix and router.

If $\eta$ is a constant, the effective window size $w_e$ may be approximately $5/\eta$ as reported in Di Caro, 2004. A constant value for $\eta$ may be selected since the updating frequency is high enough to ignore the factor of elapsed time. $d_{ijk}(t+\Delta t)$ is the real-time measurement of RTT for the face k which is selected to send the probe. It may not be asserted that this face is good or bad using only the fact that it is selected since the RTT for other faces are not available for comparison. (The broadcast option may be an exception). However, a measure of how much reinforcement should be added to this face may be obtained by comparing the probed RTT with the statistical information of RTT. That is, the better the face is, the more reinforcement is added. This parameter may be referred to as reinforcement and it may be denoted by $r_{ijk}$. Reinforcement of face k for prefix j at node i may be a function of the most recently probed delay of face k and statistics of delay and, more specifically, of the mean and the variance of the delay.

To be able to apply reinforcement to the goodness of the face from which the probe-data returns, the face may be enhanced in an inverse proportion to the most recently probed delay. That is, less delay causes more reinforcement. In addition, reinforcement should be proportional to the stability of probed delay related to the dispersion in certain window size. In other words, this factor tells how much we should trust this probed delay. The r function may be used directly from Di Caro, 2004, since the function is reported to be the best after testing different linear, quadratic and hyperbolic combinations of most recent delay and statistics of the delay. Any other alternatives considering aforementioned two factors to compute reinforcement are also possible. The definition of the reinforcement function in Di Caro, 2004, is described as follows with some modifications, customization and additional comments.

Let $\mu^*_{ij}(t+\Delta t)$ be the best delay at time $t+\Delta t$ for prefix j at router i observed over a moving window with size $w_s$. $w_s$ is given by:

$$w_s = 5\phi/\eta, \text{ where } \phi \leq 1.$$

Thus the best delay over the window also needs to be maintained. $\phi$ may be used to tune the effective window size to a shorter term observation window size. Thus the lower bound of estimated delay is given by $\mu_{ij}^*(t+\Delta t)$ and the upper bound of estimated delay is:

$$\mu_{ij}(t+\Delta t)+(1/\sqrt{(1-\gamma)})\times (\sigma_{ij}(t+\Delta t)(\sqrt{w_s})$$

where $0 \leq \gamma < 1$ represents the confidence level. The confidence level decides the accuracy of estimation. The upper bound of estimated delay results from Chebyshev's inequality which gives a loose bound without needing the specific distribution, which may be useful since it may be difficult or impossible to determine the distribution of delay. The difference between the upper bound and lower bound is the estimated maximum dispersion (with confidence interval $\gamma$), $\theta_{ij}(t+\Delta t)$:

$$\theta_{ij}(t+\Delta t)=\mu_{ij}(t+\Delta t)+(1/\sqrt{(1-\gamma)})\times (\sigma_{ij}(t+\Delta t)/\sqrt{w_s})-\mu^*_{ij}(t+\Delta t)$$

The reinforcement r may be defined as:

$$r_{ijk}(t+\Delta t) = \beta \times \frac{\mu_{ij}^*(t+\Delta t)}{d_{ijk}(t+\Delta t)} + (1-\beta) \times \frac{\theta_{ij}(t+\Delta t)}{\theta_{ij}(t+\Delta t) + (d_{ijk}(t+\Delta t) - \mu_{ij}^*(t+\Delta t))},$$

where $0 \leq \beta \leq 1$ weights two terms. $\beta$ may be tunable for different network conditions. The first term, $$\frac{\mu_{ij}^*(t+\Delta t)}{d_{ijk}(t+\Delta t)},$$

reflects the first factor (i.e., how good is the probe delay compared with the best delay in the shorter term window). As can be seen, the first term is proportional to the best average delay and negatively proportional to the new probed delay. The second term, $$\frac{\theta_{ij}(t+\Delta t)}{\theta_{ij}(t+\Delta t) + (d_{ijk}(t+\Delta t) - \mu_{ij}^*(t+\Delta t))},$$

evaluates the stability of probed delay in the shorter term window. For clarify, the second term is transformed to $$\frac{1}{1 + (d_{ijk}(t+\Delta t) - \mu_{ij}^*(t+\Delta t))/\theta_{ij}(t+\Delta t)}.$$

It is clear that the smaller of the ratio of latest observed dispersion $(d_k - \mu^*)$ for probed delay and estimated maximum dispersion ($\theta$) is, the larger this term becomes. Since estimated maximum dispersion reflects the network stability in window with size w, and latest observed dispersion reflects the distance of probed delay and best delay the second term evaluates the reinforcement with respect to the ratio of network stability and the goodness of new probed delay. However, attention should be paid when the denominator of the second term becomes 0.

As an option, it may improve the performance to reward high reinforcement while discount low reinforcement. Ant-Net uses a squash function for this purpose. Other alternative functions are also possible. The squash function is given by:

$$s(x) = \left(1 + \exp\left(\frac{a}{x \times K}\right)\right)^{-1}, \quad 0 < x \leq 1, a \geq 0,$$

where K is the number of faces for certain prefix in certain node while $a/K$ combats the tendency of uniform selection probability (this tendency increases as K increases) by increasing the reinforcement with respect to K. The squashed reinforcement is given by:

$$r_{ijk}(t) \leftarrow (r_{ijk}(t))/s(1).$$

As can be seen later, if the reinforcement becomes 1, the selection probability for this face will be 100%. 100% selection probability disables the ability of exploring alternative faces. To prevent reinforcement from 1, either a threshold of reinforcement (denoted by $\gamma$) or a threshold of probability (denoted by $\pi$) may be adopted.

Finally, a selection probability for initiating probe interests is considered. At router i, the selection probability of face k of prefix j at time t is denoted as $p_{ijk}(t)$. The selection probability for prefix j at node i of all faces at time 0 is initialized as equal values:

$$p_{ijk}(0) = 1/K_{ij},$$

where $K_{ij}$ is the number of faces for prefix j at node i. Every time, a probed-data for prefix j is returned from any face k, the selection probability of all the faces in the prefix may be incremented.

If a probe data comes back after $\Delta t$, the selection probability for face k is updated by:

$$p_{ijk}(t+\Delta t) = p_{ijk}(t) + r_{ijk}(t+\Delta t)(1 - p_{ijk}(t)).$$

And the selection probability for all the face(s) other than k is given by:

$$p_{ij\bar{k}}(t+\Delta t) = p_{ij\bar{k}}(t) - r_{ijk}(t+\Delta t) \times p_{ij\bar{k}}(t), \forall \bar{k} \in K_{ij} \setminus \{k\}.$$

In independent mode, the selection probability of regular interest is independent of probe interest. Thus this can be taken advantage of to avoid selecting a very bad face (probabilistically) for regular interests by depressing low probabilities by:

$$\tilde{p}_{ijk}(t) = p_{ijk}{}^\epsilon(t),$$

Where $\epsilon$ is a parameter to tune how much we want to depress low probabilities. Di Caro, 2004, suggests that $\epsilon$ be 1.4. Let $p'_{ijk}(t)$ denote the selection probability for regular interest in independent mode. It is given by normalizing $\tilde{p}_{ijk}(t)$:

$$p'_{ijk}(t) = \frac{\tilde{p}_{ijk}(t)}{\sum_{k' \in \mathcal{K}_{ij}} \tilde{p}_{ijk'}(t)}.$$

The selection probabilities for probe interests in independent mode should not be depressed. In dependent mode, since the selection probabilities are shared between probe and regular interests this depressing technique may not be taken.

Turning now to the enforcement policy, the enforcement policy refers to the policy defined either by the forwarding strategy itself or by nodes on the path. For example, the forwarding policy may forward the interest to n faces probabilistically to improve the resilience and delay. (Increasing traffic negatively affects the delay as well.) Probe-interest and probe-data may be used to carry the enforcement policy of the nodes on the path. For example, nodes in the path may utilize probe-interest and probe-data to explicitly inform the original node about these nodes' availability. The availability of the nodes in the path may vary over the time. When some local status, such as link utilization or service load, on a node exceeds a certain threshold, the node may be set as unavailable. A new field may be added into the data structure carried by probe-interest and the probe-data to specify the availability of the node. Any node that is indicated as unavailable on the path will enforce the selection probability for the face reset to 0. Let $P_{ijk}$ be the set of nodes at the path of at the path of request content j from node i via face k. Let $a_{ijki'}$ be the Boolean availability notation of node belonging to $P_{ijk}$. That is, $$\prod_{i' \in \mathcal{P}_{ijk}} a_{ijki'} = 0 \Rightarrow q_{ijk} = 0.$$

Note that $P_{ijk}$, $a_{ijki}$, and $q_{ijk}$ are dependent on time. Thus, if any node along the path is unavailable, the selection probability is forced to 0. The time domain notation is omitted for the sake of brevity. Any local or non-local enforcement policy may be easily added to the disclosed forwarding strategy. This may be particularly useful for ad-hoc networks where topology is dynamic.

Turning now to multiple metrics, the "raw" delay may be used as a single metric to compute selection probability so far. The single metric may be extended to include multiple metrics by using a composite function of weighted probed metrics. Assuming that the set of metrics to consider is M, let $d_{ijkm}$ be the collected value for metric m, $d_{ijk}$ be the composite value for all metrics at node i requesting content j via face k and $p_m$ be the weight given to metric m. Thus:

$$d_{ijk} = \sum_{m \in M} \rho_m d_{ijkm},$$
$$\text{where} \sum_{m \in M} \rho_m = 1.$$

The local statistics may also be obtained with respect to the composite metric. The rest of the computation and update for selection probability may follow the same procedure as described above. In an embodiment, to avoid modifying the formulae to measure the goodness of the path, any other metric may be consistent with the delay metric with respect to its relationship with the goodness of the path. Namely, the metric may be inversely proportional to the goodness of the path. This is the case with most metrics, such as link utilization and service load, which conform to this property. If the metric does not, an appropriate transformation may be made, e.g., taking the reciprocal.

Turning now to a description of a fast probe, in the independent mode, the probe interest/data may share the same queues with regular interest/data. One effect may be that these probe interest/data packets experience the same delay as the concurrent regular interest/data packets. Therefore, the probed delay accurately reflects that of the regular interest and data. One disadvantage is that the probes suffer the shared queues with regular interest and data. It is possible that when the delay is returned by probes that the network conditions may have changed. This may be more pronounced in highly dynamic environments. QoS policy such as a priority queue may be used to probe interest/data at each node in such environments. This may be similar to a dedicated channel for control messages in a telecommunication networks.

The delay in the fast path may experience the same propagation delay, transmission delay, and node processing delay as that in the regular path. However, the queuing delay between the two is different. Thus, the queuing delay of the regular path may be taken into consideration when calculating selection probability. A simple M/M/1 model may be used to approximate the average delay at every hop based on the bandwidth and the packet arrival rate. Let $B_e$ be the bandwidth at link e. Let $b_e$ be the average packet size of data traffic at this link. Let $a_e$ be the average arrival rate at link e. This information is locally available at each node. The average delay may be given by:

$$\ell_e = 1 \bigg/ \left( \frac{B_c}{b_e} - a_e \right).$$

The total average queuing delay in the round trip path is the summation of all links in the round trip path:

$$\ell_{ijk} = \sum_{e \in \mathcal{P}_{ijk}} \ell_e.$$

Figure 6:
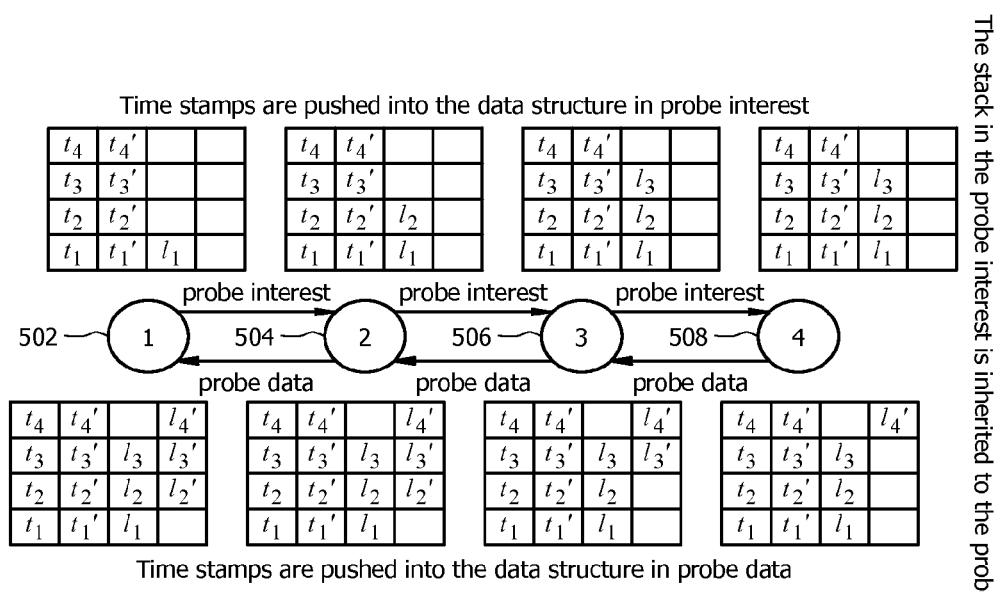
FIG. 6 is a diagram illustrating an exemplary manner of recording time stamps and average queuing delay during interest propagation and data return in accordance with a disclosed embodiment.

In some embodiments, the M/M/1 model may not be realistic. However, it may be the best approximation that can be performed for a reasonable complexity when the arrival and service distributions are unknown. At each node the average delay may be pushed to the data structure. FIG. 6 modifies FIG. 5 and shows the average queuing delay is also pushed into the data structure in the probe interest and data.

The calculation of composite metric of the probed delay and approximated queuing delay in the independent mode falls into the case of multiple metrics. Let $\hat{d}_{ij}$ be the composite metric. Then:

$$\hat{d}_{ij} = \rho \times d_{ij} + (1-\rho) \times l_{ij}, \text{ where } 0 \le \rho \le 1.$$

The parameter $\rho$ is used to tune the weights of probed delay of the fast path and approximated queuing delay on the regular path.

Regarding path exploitation, in NDN, it may be possible that a new node has cached the requested content. However, this new information may not be available to the forwarding strategy plane until the routing plane converges and updates the FIB. This time difference may degrade the network performance in highly dynamic network environments. The forwarding strategy may also take over part of the path discovery functionality.

The probe interests may be broadcast periodically. It is the same as the broadcast option. If a good new path is found, the forward strategy may add the new face to a corresponding entry in the FIB. The frequency of exploring paths may be tuned for different network environments since frequency of exploring paths may lead to an "interest flood".

Figure 7:
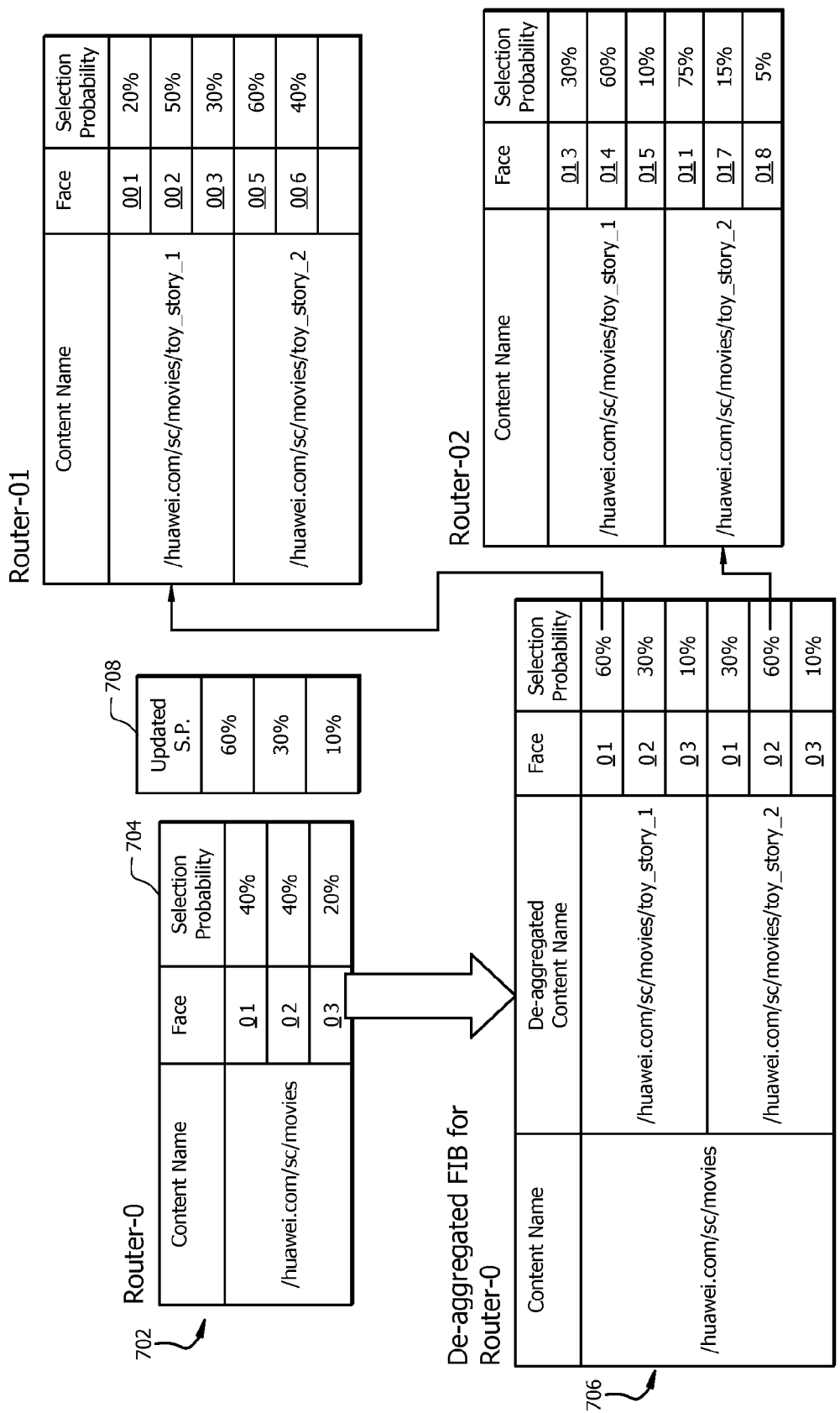
FIG. 7 is a diagram illustrating prefix aggregation in the FIB according to a disclosed embodiment.

Turning now to prefix aggregation, to contain the size of the FIB, and considering the content space, a single name prefix in the FIB may summarize several content objects. The mechanism leaves the job of de-aggregating the interests to its content source to the upstream nodes. The problem arises when the path for a name/prefix which is aggregated is probed. In the example depicted in FIG. 7, a user requests /huawei.com/sc/movies/toy_story_1 at Router-0. The request is longest matched to the aggregated entry /huawei.com/sc/movies. The selection probability 704 in FIB 702 for Router-0 is shown in FIG. 7. Assume the probes via face 01 is least delayed. Therefore, the selection probability for face 01 increases as more and more probes reinforce it. Then the selection probability table 708 may be updated as shown FIG. 7. Now assume the user requests /huawei.com/sc/movies/toy_story_2 at Router-0. The request is again longest matched to the same aggregated entry /huawei.com/sc/movies. Based on the selection probability, the interest is sent to Router-00 more often (in the probabilistic sense). Assume fetching from Router-01 has less delay in reality, but the selection probability derived for /huawei.com/sc/movies/toy_story_1 traps router-0 from fetching from Router-01. If the interest for toy_story_1 and toy_story_2 interleaving arrives, this situation may get worse. Thus it may be necessary to de-aggregate the FIB entries to several granular entries based on the interest traffic for contents under that prefix. The de-aggregated FIB 706 for Router-0 is shown in FIG. 7. Because the de-aggregation is done level by level, the increasing of FIB entries is performed in a gradual manner and the number of content entries becomes smaller from core to the edge. Therefore, this modification does not significantly increase the size of FIB.

Turning now to achieve reliable transmission by exploring multiple faces at NDN strategy layer. The estimated delay (RTT) is computed in delay statistics computer. The estimated delay may be used as the time out for triggering resending interest via next highest probability face.

Figure 8:
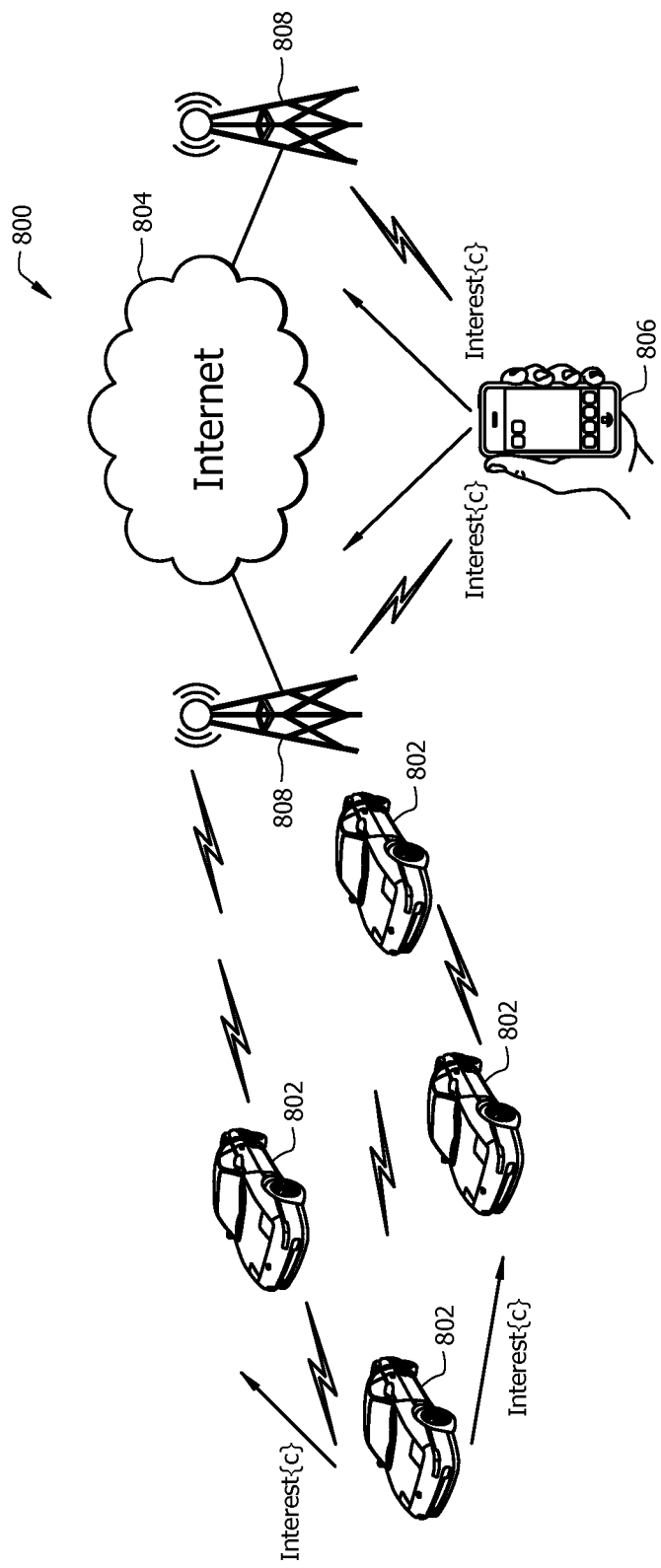
FIG. 8 is a diagram of a wireless network in which the adaptive forwarding strategies may be implemented in accordance with a disclosed embodiment.

In an embodiment, the disclosed adaptive forwarding strategies may be used for content dissemination in wireless scenarios where link quality varies. FIG. 8 is a diagram of a wireless network 800 in which the adaptive forwarding strategies may be implemented in accordance with a disclosed embodiment. The wireless network 800 may comprise a plurality of wireless communication enabled vehicles 802, the Internet 804, wireless mobile device 806, and base stations 808. The components of network 800 may be arranged as shown in FIG. 8. Infrastructureless cases in which the adaptive forwarding strategies may be implemented include ad hoc networks and vehicle 802 to vehicle 802 communication. The disclosed adaptive forwarding strategies may also be used with infrastructure such as a multi-homed scenario. In an embodiment, the disclosed adaptive forwarding strategy may provide several tunable parameters such as, for example, the weight of latest probed metric in sliding window, the size of historical observation window for non-sliding window, the weights of new probed metric and the network stability.

Figure 9:
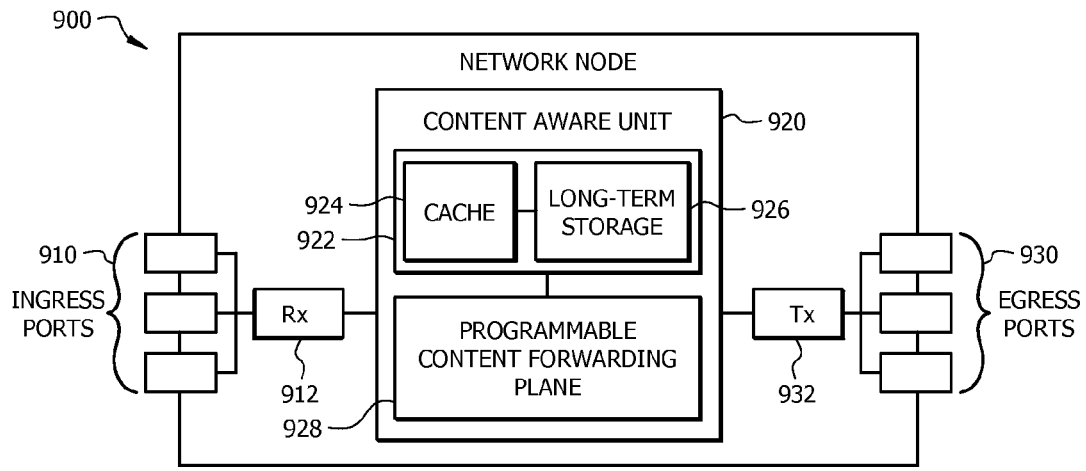
FIG. 9 illustrates an embodiment of a network node, which may be any device that transports and processes data through a network.

FIG. 9 illustrates an embodiment of a network node 900, which may be any device that transports and processes data through a network. For instance, the network node 900 may be a content router or any node or router in the NDN schemes described above. The network node 900 may be configured to implement or support the adaptive forwarding strategies described above. The network node 900 may comprise one or more ingress ports or faces 910 coupled to a receiver (Rx) 912 for receiving signals and frames/data from other network components. The network node 900 may comprise a content aware unit 920 to determine which network components to send content to. The content aware unit 920 may be implemented using hardware, software, or both. The network unit 900 may also comprise one or more egress ports or faces 930 coupled to a transmitter (Tx) 932 for transmitting signals and frames/data to the other network components. The receiver 912, content aware unit 920, and transmitter 932 may also be configured to implement at least some of the disclosed methods, which may be based on hardware, software, or both. The components of the network node 900 may be arranged as shown in FIG. 9.

The content aware unit 920 may also comprise a programmable content forwarding plane block 928 and one or more storage blocks 922 that may be coupled to the programmable content forwarding plane block 928. The programmable content forwarding plane block 928 may be configured to implement content forwarding and processing functions, such as at an application layer or layer 3 (L3) in the Open Systems Interconnection (OSI) model, where the content may be forwarded based on content name or prefix and possibly other content related information that maps the content to network traffic. Such mapping information may be maintained in a content table at the content aware unit 920 or the network unit 900. The programmable content forwarding plane block 928 may interpret user requests for content and accordingly fetch content, e.g., based on metadata and/or content name, from the network or other content routers and may store the content, e.g., temporarily, in the storage blocks 922. The programmable content forwarding plane block 928 may then forward the cached content to the user. The programmable content forwarding plane block 928 may be implemented using software, hardware, or both and may operate above the IP layer or layer 2 (L2) in the OSi model. The storage blocks 922 may comprise a cache 924 for temporarily storing content, such as content that is requested by a subscriber. Additionally, the storage blocks 922 may comprise a long-term storage 926 for storing content relatively longer, such as content submitted by a publisher. For instance, the cache 924 and the long-term storage 926 may include Dynamic random-access memories (DRAMs), solid-state drives (SSDs), hard disks, or combinations thereof.

Figure 10:
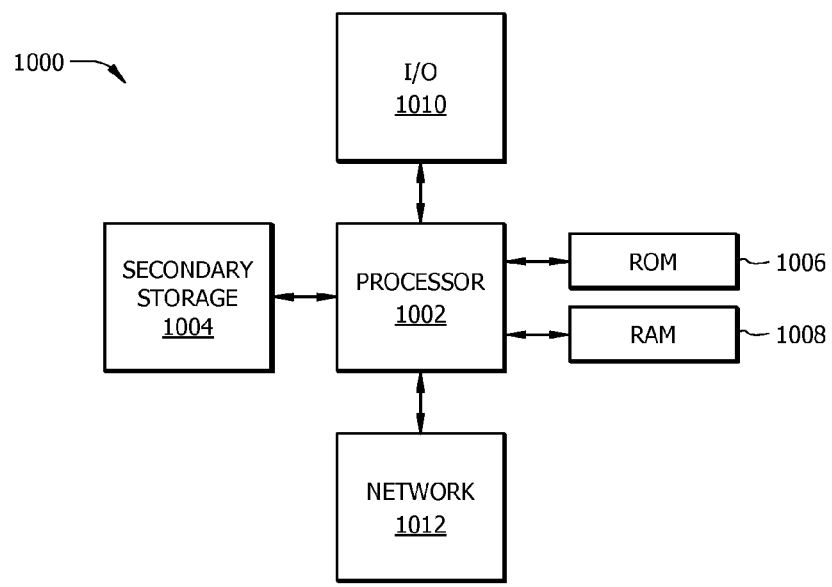
FIG. 10 illustrates a typical, general-purpose network node suitable for implementing one or more embodiments of the components disclosed herein.

The network nodes and devices described above may be implemented on any general-purpose network node, such as a computer or network node with sufficient processing power, memory resources, and network throughput capability to handle the necessary workload placed upon it. FIG. 10 illustrates a typical, general-purpose network node 1000 suitable for implementing one or more embodiments of the components disclosed herein. The network node 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application-specific integrated circuits (ASICs) or digital signal processors (DSPs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004. Network component 1000 may implement any of the software patch upgrade methods and systems described above. The processor 1002 may implement the face probability determinations described above.

The network connectivity devices 102 may comprises a plurality of faces. The network connectivity devices 312 may serve as an output and/or input device of communication device 300. The network connectivity devices 312 may take the form of routers, modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 312 may enable the processor 302 to communicate with an Internet and/or one or more intranets and/or one or more client devices. The network connectivity devices 312 may include multiple antennas.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A named-data networking (NDN) node, comprising:
a plurality of faces each of which is coupled to a different node in a content-centric network; and
a processor coupled to the faces, wherein the processor is configured to probe the performance of each of the faces for an interest, wherein the interest is associated with multiple ones of the faces,
a forwarding information base (FIB) configured to maintain a probing probability for each of a plurality of prefixes, a selection probability per face per prefix and associated policies for regular interest forwarding,
wherein the selection probabilities per face per prefix indicate a statistical probability that interest packets associated with a prefix are transmitted via an associated face,
wherein a next-hop is identified by the face,
wherein a one of the faces associated with the interest is used to forward the interest when the interest is received by the NDN node, and
wherein the one of the faces used is determined based on a selection probability determined from feedback from the probe of the performance of the faces.

2. The NDN node of claim 1, wherein the NDN node is a core node, and wherein the NDN node uses its own probe to update its forwarding information base (FIB) and forwarding policies.

3. A named-data networking (NDN) node, comprising:
a plurality of faces each of which is coupled to a different node in a content-centric network; and
a processor coupled to the faces, wherein the processor is configured to probe the performance of each of the faces for an interest, wherein the interest is associated with multiple ones of the faces,
wherein a next-hop is identified by the face,
wherein a one of the faces associated with the interest is used to forward the interest when the interest is received by the NDN node,
wherein the one of the faces used is determined based on a selection probability determined from feedback from the probe of the performance of the faces, and
wherein the NDN node is a core node, and wherein the NDN node leverages the probes injected by an edge node to tune its FIB and local forwarding policies.

4. A named-data networking (NDN) node, comprising:
a plurality of faces each of which is coupled to a different node in a content-centric network; and
a processor coupled to the faces, wherein the processor is configured to probe the performance of each of the faces for an interest, wherein the interest is associated with multiple ones of the faces,
wherein a next-hop is identified by the face,
wherein a one of the faces associated with the interest is used to forward the interest when the interest is received by the NDN node, and
wherein the one of the faces used is determined based on a selection probability determined from feedback from the probe of the performance of the faces,
wherein the NDN node uses its own probes and leverages probes injected in the network by other nodes in the network to update its FIB and local forwarding policies.

5. The NDN node of claim 1, wherein the NDN node is coupled to a wireline network, an infrastructureless network, or an ad hoc network.

6. A named-data networking (NDN) node, comprising:
a plurality of faces each of which is coupled to a different node in a content-centric network; and
a processor coupled to the faces, wherein the processor is configured to probe the performance of each of the faces for an interest, wherein the interest is associated with multiple ones of the faces, wherein a next-hop is identified by the face, wherein a one of the faces associated with the interest is used to forward the interest when the interest is received by the NDN node, wherein the one of the faces used is determined based on a selection probability determined from feedback from the probe of the performance of the faces, and wherein the processor is configured to update the selection probability after a probed-data for a prefix j is returned from face k, wherein the updated selection probability for face k is determined by $$p_{ijk}(t+\Delta t)=p_{ijk}(t)+r_{ijk}(t+\Delta t)(1-p_{ijk}(t))$$

where $p_{ijk}(t)$ is the selection probability for the prefix j at face k of router i at time t, where $p_{ijk}(t+\Delta t)$ is the updated selection probability for the prefix j at face k of router i at time t+$\Delta t$, and where $r_{ijk}(t+\Delta t)$ is a reinforcement factor that indicates a desirability of the face k for prefix j at node i.

7. The NDN node of claim 6, wherein the squashed reinforcement value r is $$r_{ijk}(t) \leftarrow s(r_{ijk}(t))/s(1),$$

where $r_{ijk}(t)$ is a reinforcement value and $s(r_{ijk}(t))$ is a squash function as a function of $r_{ijk}(t)$ and $s(1)$ is a squash function as a function of 1, wherein the squash function compresses low reinforcement values and expands high reinforcement values.

8. The NDN node of claim 7, further comprising a threshold of reinforcement or a threshold of probability to prevent the selection probability for a face from being 100%.

9. The NDN node of claim 7, wherein the reinforcement value r is given by $$r_{ijk}(t+\Delta t) = \beta \times \frac{\mu_{ij}^*(t+\Delta t)}{d_{ijk}(t+\Delta t)} + (1-\beta) \times \frac{\theta_{ij}(t+\Delta t)}{\theta_{ij}(t+\Delta t)+(d_{ijk}(t+\Delta t)-\mu_{ij}^*(t+\Delta t))},$$

where $$\frac{\mu_{ij}^*(t+\Delta t)}{d_{ijk}(t+\Delta t)},$$

reflects the first factor: how good is the probe delay compared with the best delay in the shorter term window, wherein the second term, $$\frac{\theta_{ij}(t+\Delta t)}{\theta_{ij}(t+\Delta t)+(d_{ijk}(t+\Delta t)-\mu_{ij}^*(t+\Delta t))},$$

evaluates the stability of probed delay and stability of the network in the shorter term window.

10. The NDN node of claim 4, further comprising a probe engine (PrE) configured to send probe interests, receive probe data, and post-process the probe data and probe interests.

11. The NDN node of claim 10, further comprising a selection probability computer (SPC) configured to receive a latest delay from the PrE.

12. The NDN node of claim 6, further comprising a probe engine (PrE) configured to send probe interests, receive probe data, and post-process the probe data and probe interests, wherein the PrE transmits a latest delay to a delay statistics computer (DSC).

13. The NDN node of claim 3, wherein probe performance interest share a same queue with data interest.

14. The NDN node of claim 1, wherein the processor is further configured to determine an estimated delay, wherein the estimated delay is used as a time out for triggering resending the interest via a next highest probability face.

15. A method in a network node for forwarding data in a content-centric network, comprising:
    associating an interest with multiple faces in the network node;
    probing with a processor each of the faces with a probe interest corresponding to the interest to determine the performance of each of the faces;
    updating a selection probability entry for an interest in a forward information base (FIB) based on the feedback from probing the faces;
    maintaining, in the FIB, selection probabilities per face per prefix, wherein the selection probabilities per face per prefix indicate a statistical probability that interest packets associated with a prefix are transmitted via an associated face; and
    forwarding with a transmitter a requesting interest received at the network node based on the selection probability when content corresponding to the requested interest is not contained within a content store of the network node.

16. A method in a network node for forwarding data in a content-centric network, comprising:
    associating an interest with multiple faces in the network node;
    probing with a processor each of the faces with a probe interest corresponding to the interest to determine the performance of each of the faces; and
    updating a selection probability entry for an interest in a forward information base (FIB) based on the feedback from probing the faces,
    wherein the updated selection probability for face k is determined by $$p_{ijk}(t+\Delta t)=p_{ijk}(t)+r_{ijk}(t+\Delta t)(1-p_{ijk}(t))$$

where $p_{ijk}(t)$ is the selection probability for the prefix j at face k of router i at time t, where $p_{ijk}(t+\Delta t)$ is the updated selection probability for the prefix j at face k of router i at time t+$\Delta t$, and where $r_{ijk}(t+\Delta t)$ is a reinforcement factor that indicates a desirability of the face k at time t+$\Delta t$.

17. The method of claim 16, wherein the updated selection probability for the faces other than face k is determined by $$p_{ij\bar{k}}(t+\Delta t)=p_{ij\bar{k}}(t)-r_{ijk}(t+\Delta t)\times p_{ij\bar{k}}(t), \forall \bar{k} \in K_{ij}\backslash\{k\}.$$

18. The method of claim 16, further comprising determining a delay $d_{mj}$ for the content associated with prefix j at an intermediate node m en route to the destination node d to update the selection probability, wherein the delay $d_{mj}$ is given by:

$$d_{mj}=RTT_{md}=t_{mj}'-t_{mj}, i \Delta P_{sd},$$

where $P_{sd}$ denotes the set of all nodes in the path from s to d inclusively.

19. The method of claim 15, further comprising obtaining multiple probe metrics from probing, wherein the multiple metrics are weighted and combined into a composite metric, wherein the composite metric is used to update the selection probability.

20. The method of claim 15, wherein probe performance interest and probe performance data share a same queue with data interest data.

21. A method in a network node for forwarding data in a content-centric network, comprising:
- associating an interest with multiple faces in the network node;
- probing with a processor each of the faces with a probe interest corresponding to the interest to determine the performance of each of the faces;
- updating a selection probability entry for an interest in a forward information base (FIB) based on the feedback from probing the faces;
- sampling incoming data interest traffic and using the incoming data interest traffic to probe the performance of the faces; and
- maintaining, in the FIB, a plurality of selection probabilities per face per prefix,
- wherein the selection probabilities per face per prefix indicate statistical probabilities that interest packets associated with a prefix are transmitted via an associated face.

22. A method in a network node for forwarding data in a content-centric network, comprising:
- associating an interest with multiple faces in the network node;
- probing with a processor each of the faces with a probe interest corresponding to the interest to determine the performance of each of the faces;
- updating a selection probability entry for an interest in a forward information base (FIB) based on the feedback from probing the faces;
- receiving at one of the faces a return data from a remote node, wherein the return data comprises a plurality of time stamps; and
- determining for an interest associated with the probe interest a percentage that each of the faces should be used for forwarding the interest to a node to retrieve content associated with the interest when the interest is received by the network node,
- wherein the percentage is determined based on the time stamps.

23. The method of claim 22, wherein the time stamps indicate when a node received the probe interest, when a node transmitted the probe interest, when a node received the return data, and when a node transmitted the return data.

24. The method of claim 22, wherein the return data comprises delay information for at least one node to which the probe interest was forwarded.

25. A network node, comprising:
- a plurality of faces each providing a communication path to a corresponding node;
- a memory configured to implement a forwarding information base (FIB);
- a processor in a Central Processing Unit (CPU) coupled to the faces and the memory and configured to implement:
  - a control plane routing level wherein multiple faces are associated with a prefix of a content name corresponding to an interest;
  - a probe engine to probe the interest for each of the multiple faces; and
  - a forwarding layer comprising strategy information to determine which one of the multiple faces to use for forwarding an incoming interest corresponding to the prefix,
- wherein the strategy information is determined based on results of the probe,
- wherein the probe engine is configured to use a probe interest corresponding to the interest to probe the multiple faces,
- wherein a return data from a probe interest does not comprise content associated with the interest, and
- wherein the network node uses its own probes and leverages probes injected in a network by other nodes in the network to update the FIB and local forwarding policies.

26. The network node of 25, wherein the return data comprises time stamps each corresponding to one of a time a node received the probe interest, a time a node transmitted the probe interest, a time a node received the return data, and a time a node transmitted the return data.

27. The network node of 25, wherein the return data comprises delay information for at least one node to which the probe interest was forwarded.

28. The network node of claim 25, wherein the forwarding layer comprises the FIB, and wherein the FIB is a de-aggregated content name FIB.

29. The network node of claim 25, wherein interests transmitted from the network node comprise a marker indicating whether the interest is a probe performance interest or a data interest.

* * * * *

UNITED STATES PATENT AND TRADEMARK OFFICE
CERTIFICATE OF CORRECTION

PATENT NO. : 8,762,570 B2
APPLICATION NO. : 13/672924
DATED : June 24, 2014
INVENTOR(S) : Qian et al.

Page 1 of 1

It is certified that error appears in the above-identified patent and that said Letters Patent is hereby corrected as shown below:

In the Claims,

Column 22, Lines 51-59, Claim 18 should read:

18. The method of claim 16, further comprising determining a delay $d_{mj}$ for the content associated with prefix $j$ at an intermediate node $m$ *en route* to the destination node $d$ to update the selection probability, wherein the delay $d_{mj}$ is given by:

$$d_{mj} = RTT_{md} = t'_{mj} - t_{mj}, i \in \mathcal{P}_{sd},$$

where $P_{sd}$ denotes the set of all nodes in the path from $s$ to $d$ inclusively.

Signed and Sealed this
Sixteenth Day of June, 2015

Michelle K. Lee
*Director of the United States Patent and Trademark Office*